(12) United States Patent
Leclerc et al.

(10) Patent No.: US 8,740,391 B2
(45) Date of Patent: Jun. 3, 2014

(54) DEVICES AND METHODS FOR PROVIDING A DISTRIBUTED MANIFESTATION IN AN ENVIRONMENT

(71) Applicants: Vincent Leclerc, Montreal (CA); Patrick Keroulas, Montreal (CA); Vincent de Belleval, Montreal (CA)

(72) Inventors: Vincent Leclerc, Montreal (CA); Patrick Keroulas, Montreal (CA); Vincent de Belleval, Montreal (CA)

(73) Assignee: ESKI Inc., Montreal (CA)

( * ) Notice: Subject to any disclaimer, the term of this patent is extended or adjusted under 35 U.S.C. 154(b) by 0 days.

(21) Appl. No.: 13/801,775

(22) Filed: Mar. 13, 2013

(65) Prior Publication Data
US 2013/0250184 A1    Sep. 26, 2013

Related U.S. Application Data

(63) Continuation of application No. PCT/CA2011/000700, filed on Jun. 14, 2011.

(60) Provisional application No. 61/449,290, filed on Mar. 4, 2011.

(51) Int. Cl.
*G03B 21/00*    (2006.01)

(52) U.S. Cl.
USPC .............. 353/46; 363/30; 363/51; 363/98; 363/121; 363/122; 359/10; 359/11; 359/22

(58) Field of Classification Search
USPC ............ 353/29, 30, 31, 46, 51, 98, 121, 122; 359/4, 9, 10, 11, 15, 21, 22, 30, 35; 348/207.99, 335, 222.1, 234, 241, 272, 348/743–747; 349/5, 7–9, 201; 345/126, 345/87, 102, 611
See application file for complete search history.

(56) References Cited

U.S. PATENT DOCUMENTS

| | | | |
|---|---|---|---|
| 4,706,006 A | 11/1987 | Solomon | |
| 4,729,071 A | 3/1988 | Solomon | |
| 4,777,568 A | 10/1988 | Solomon | |
| 4,811,182 A | 3/1989 | Solomon | |
| 4,893,225 A | 1/1990 | Solomon | |
| 4,897,770 A | 1/1990 | Solomon | |
| 4,958,265 A | 9/1990 | Solomon | |
| 4,974,946 A | 12/1990 | Solomon | |
| 4,983,031 A | 1/1991 | Solomon | |
| 5,986,781 A * | 11/1999 | Long | 359/30 |
| 6,404,409 B1 | 6/2002 | Solomon | |
| 6,857,746 B2 * | 2/2005 | Dyner | 353/28 |
| 7,736,021 B2 | 6/2010 | Solomon | |
| 7,863,552 B2 * | 1/2011 | Cartlidge et al. | 250/208.1 |

(Continued)

Primary Examiner — Sultan Chowdhury
(74) Attorney, Agent, or Firm — Wolf, Greenfield & Sacks, P.C.

(57) ABSTRACT

The present invention concerns a projection system for providing a distributed manifestation within an environment. The projection system includes a data generator for generating a plurality of data sets of associated state data and spatial coordinate data. The projection system also includes a projector in communication with the data generator for receiving the data sets. The projector is provided with a signal generating module for generating a plurality of electromagnetic signals, and a projecting module for projecting each of the electromagnetic signals towards a target location within the environment. The projection system also includes a plurality of receiving units distributed within the environment, each receiving unit having a receiver for receiving one of the electromagnetic signals when the receiving unit is positioned in the corresponding target location, each receiving unit being adapted to perform a change of state in response to the state data.

28 Claims, 9 Drawing Sheets

(56) References Cited

U.S. PATENT DOCUMENTS

| | | |
|---|---|---|
| 8,194,118 B2 | 6/2012 | Solomon |
| 8,312,173 B2 | 11/2012 | Berg et al. |
| 2002/0118147 A1 | 8/2002 | Solomon |
| 2003/0234914 A1 | 12/2003 | Solomon |
| 2004/0130783 A1 | 7/2004 | Solomon |
| 2005/0151941 A1 | 7/2005 | Solomon |
| 2006/0033992 A1 | 2/2006 | Solomon |
| 2006/0126336 A1 | 6/2006 | Solomon |
| 2006/0139750 A1 | 6/2006 | Solomon |
| 2011/0007277 A1 | 1/2011 | Solomon |
| 2012/0050566 A1* | 3/2012 | Cote et al. .................. 348/224.1 |
| 2012/0056799 A1 | 3/2012 | Solomon |

* cited by examiner

DEVICES AND METHODS FOR PROVIDING A DISTRIBUTED MANIFESTATION IN AN ENVIRONMENT

RELATED APPLICATIONS

This application is a continuation of International Application No. PCT/CA2011/000700, filed Jun. 14, 2011, entitled "Devices And Methods For Providing A Distributed Manifestation In An Environment," which claims priority to U.S. Provisional Application Ser. No. 61/449,290, filed Mar. 4, 2011, entitled "A Projecting System And A Projecting Method." The entirety of each of the above applications is incorporated herein by reference.

FIELD OF THE INVENTION

The present invention generally relates to communication technologies. More specifically, the present invention concerns a projection system, a projector and a projection method for providing a distributed manifestation in an environment.

BACKGROUND

Projectors are used for a wide variety of applications, such as light shows or animations for music concerts and other live events, corporate presentations, video conferences, home theaters, etc. Typically, a video projector receives a video signal and projects an image corresponding to the signal onto a surface, using a lens system.

Video projector technologies include LCD (Liquid Crystal Display), DLP (Digital Light Processing), LCoS (Liquid Crystal on Silicon), LED (Light Emitting Diode) and Laser Diode.

It is further known to create light animations by modifying the color of a plurality of modular elements in response to IR signals sent by a remote control. It is also known in the art to change the state of a plurality of modular elements using a distribution panel to which the module elements are connected.

An example of such system was developed by the Responsive Environments Group at the MIT Media Lab and is known as "push pin computing". This system includes a hardware and software platform for experimenting and prototyping algorithms for distributed sensor networks. The platform consists of approximately 100 nodes of inhabiting a substrate of predetermined dimensions. The system is described more in details on http://web.media.mit.edu/~lifton/research/pushpin/index.html.

Another known system is shown on the web site of the design studio of Ziagelbaum and Coelho (http://zigelbaum-coelho.com/six-forty-by-four-eighty/). Modular elements provided with LEDs react when touched by lighting up, changing color, blinking, etc. They can also be activated by an IR remote control.

Yet another known way of creating a light animation consists of using balloons linked together in a giant mesh. Each balloon is provided with electronic components and LEDs. The LEDs of each balloon are controlled via a console located on a handlebar. The handlebar includes several consoles, each console allowing to control a group of balloons, the console being linked to the electronic components of the balloons. The web site http://www.haque.co.uk/openburble.php provides details on this type of lighted animation.

A similar light animation consists of animating a giant mesh of balloons using cell phones. The mesh includes one thousand helium balloons and several dozen mobile phones. The balloons contain miniature sensor circuits and LEDs that respond to electromagnetic fields, such as those of mobile phones. When activated, the sensor circuits of each balloon communicate with one another, causing the LEDs of the entire mesh to illuminate. More information on this type of animation can be found on "http://www.haque.co.uk/skyear/information.html".

These systems provide striking and spectacular animations. However, the complexity of the resulting animations is limited, since the lighted elements are not centrally controlled or activated. In addition, the synchronization of all elements requires them to be physically linked to one another, for example via a panel, as in the "six-fourty by four-eighty" installation of Ziglebaum and Coehlo, or via a mesh, as in the SkyEar installation of Haque. This limits the mobility of the lighted elements within a given environment.

In light of the above, there remains a need for systems and methods for providing a distributed manifestation in an environment which alleviates at least some of the drawbacks of the prior art.

SUMMARY OF THE INVENTION

In accordance with a first aspect of the present invention, a projection system is provided. The projection system is for providing a distributed manifestations within an environment. The projection system comprises a data generator, a projector and a plurality of receiving units distributed within the environment.

The data generator for generating a plurality of data sets of associated state data and spatial coordinate data. The projector is in communication with the data generator for receiving the data sets therefrom. It comprises a signal generating module for generating a plurality of electromagnetic signals, each one of the electromagnetic signals being representative of the state data from one of the data sets. The projector also includes a projecting module for projecting each of the electromagnetic signals towards a target location within the environment. Each target location corresponds to the spatial coordinate data associated to the state data transmitted by the electromagnetic signal.

The plurality of receiving units is distributed within the environment. Each receiving unit is provided with a receiver for receiving one of the electromagnetic signals when the receiving unit is positioned in the corresponding target location. Each of the receiving units is also adapted to perform a change of state in response to the state data.

In accordance with another aspects of the invention, there is provided a projector for providing a distributed manifestation within an environment through a plurality of receiving units. The receiving units are adapted to perform a change of state and are positioned at target locations within the environment. The distributed manifestation is based on a plurality of data sets of associated state data and spatial coordinate data.

The projector first includes a signal generating module for generating a plurality of electromagnetic signals, and encoding each one of these electromagnetic signals with the state data from one of the data sets. Encoded electromagnetic signals are thereby obtained. The projector further includes a projecting module for projecting each of the encoded electromagnetic signals towards one of the target locations within the environment corresponding to the spatial coordinate data associated to the state data encoded within the electromagnetic signal.

Preferably, the projector is provided with an encoder and the receiving units are each provided with a decoder. Preferably, the encoder is a modulator and the decoders are demodulators. Still preferably, the state data is representative of a video stream and the receiving elements are provided with LEDs.

In accordance with yet another aspect of the present invention, a method is provided. The method comprises the steps of:
a) generating a plurality of data sets of associated state data and spatial coordinate data;
b) generating a plurality of electromagnetic signals, each one of the electromagnetic signals being representative of the state data from one of the data sets;
c) projecting each of the electromagnetic signals towards a target location within the environment corresponding to the spatial coordinate data associated with the state data transmitted by the electromagnetic signal;
d) distributing a plurality of receiving units within the environment; and
e) at each of the target locations where one of the receiving unit is positioned:
  i) receiving the corresponding electromagnetic signal; and
  ii) changing a state of said receiving unit in response to the state data.

Advantageously, the present invention allows updating individually a plurality of receiving units with a wireless technology in order to create a manifestation, for example a visual animation. Embodiments of the invention may advantageously provide systems for displaying or animating elements by controlling or animating them from at least one centralized source. Control of these elements in function of their locations within a given space may also be provided, while not limiting their displacement within this space. Embodiments may also provide the capability of wirelessly updating the modular elements dispersed within the given space.

BRIEF DESCRIPTION OF THE DRAWINGS

Other objects, advantages and features of the present invention will become more apparent upon reading the following non-restrictive description of preferred embodiments thereof, given for the purpose of exemplification only, with reference to the accompanying drawings in which.

DESCRIPTION OF PREFERRED EMBODIMENTS

Figure 1:
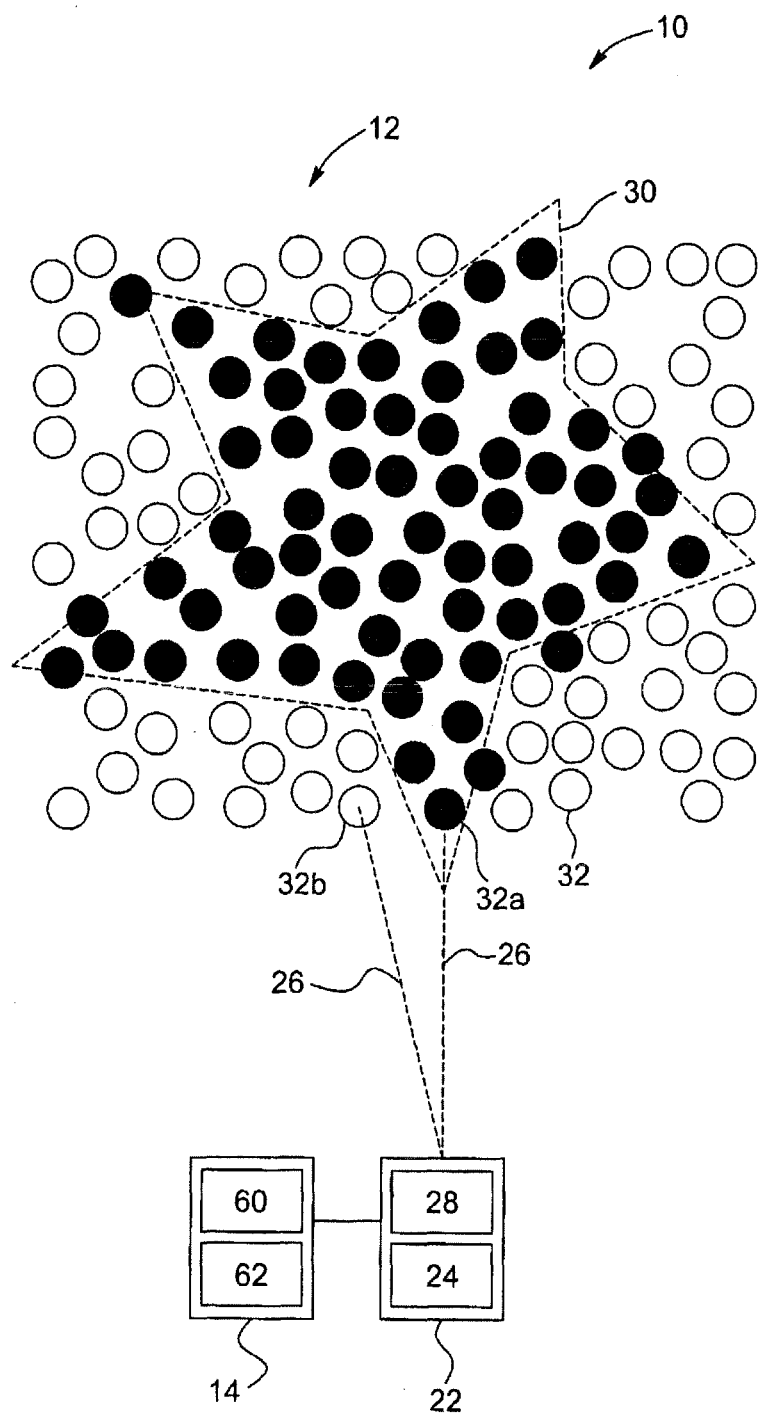
FIG. 1 is a schematic diagram of a projection system according to a preferred embodiment of the present invention.

In the following description, similar features in the drawings have been given similar reference numerals. In order to preserve clarity, certain elements may not be identified in some figures if they are already identified in a previous figure.

In accordance with a first aspect thereof, the present invention generally concerns a projecting system for creating am manifestation using a projector and several receiving units distributed within a given environment. Electromagnetic signals are sent by the projector and may vary in function of specific locations targeted by the projector. In other words, receiving units located within a target location of the environment will receive specific electromagnetic signals. These signals will include a state data, instructing the receiving element on a change of state they need to perform. The change of state can be for example a change of color. The combined effect of the receiving units will provide a manifestation, each unit displaying a given state according to its location.

The expression "manifestation" is used herein to refer to any physical phenomena which could take place within the environment. In the illustrated embodiments, the manifestation is a visual animation, such as a change in color, video, or simply the presence or absence of light or an image. The present invention is however not limited to visual animations and could be used to provide other types of manifestations such as sound, shape or odor.

The environment could be embodied by any physical space in which the manifestation takes place. Examples of such environments are infinite: the architectural surface of a public space, a theatre, a hall, a museum, a field, a forest, a city street or even the ocean or the sky. The environment need not be bound by physical structures and may only be limited by the range of propagation of the electromagnetic signals generated by the system, as will be explained in detail further below.

The receiving units can be dispersed in any appropriate manner within the environment. At any given time, the receiving unit may define a 2D or a 3D manifestation. The manifestation within the environment may be fixed for any given period of time, or dynamic, changing in real-time or being perceived to do so. The distribution of receiving elements within the environment may also be either fixed or dynamic, as will be apparent from the examples given further below.

Referring to FIG. 1, a projection system 10 according to an embodiment of the invention is shown. The projection system 10 includes a data generator 14, a projector 22 and a plurality of receiving units 32. In the illustrated example the plurality of receiving units 32 are provided with LEDs and together form the manifestation, in this case a visual display having the shape of a luminous star.

Components of projection systems according to embodiments of the invention will be described in the following section.

Data Generator

Figure 2:
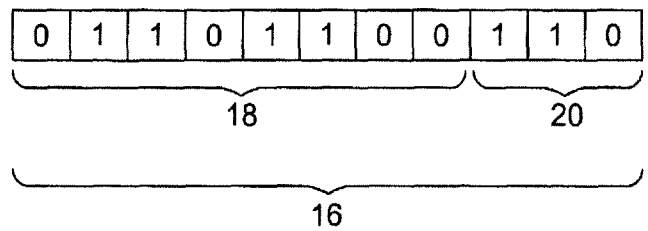
FIG. 2 is a schematic diagram of a data set, according to a preferred embodiment.

The data generator 14 can be a computer, a data server or any type of device provided with memory 60 and a processor 62, able to store and transmit data to the projector 22. In operation, the data generator 14 generates a plurality of data sets 16, for example taking the form of data structures, such as the one illustrated in FIG. 2. The data sets generated by the data generator 14 can include real-time state changes, cues or sequences of state changes to be executed by receiving units 32 located at a specific target location within the environment. Still referring to FIG. 2, each data set 16 generated includes at least state data 18 associated with spatial coordinate data 20. Of course, the data sets 16 may include further information, such as headers including information which identifies the information that follows, block of bytes with additional data and/or instructions, as well as trailers, for confirming the accuracy and stats of the data transmitted. As an example only, the data set 16 illustrated takes the form of a data structure, in which part of the payload includes state data 18 while another part of the payload includes spatial coordinate data 20. Streams of data sets can take the form of an array, a table, a queue or a matrix containing numerous data structures.

The term "state" refers to a mode or a condition which can be displayed or expressed by a receiving unit. For example, a state can take the form of a visual manifestation, such as a color, a level of intensity and/or opacity. The state can also relate to a sound, an odor or a shape. It can be a sequence of state changes in time. For example, the state data can be representative of a video stream, the distributed manifestation displayed by the receiving units 32 being a video, each receiving unit 32 thus becoming a pixel within a giant screen formed by the plurality of units 32.

In order for the projector 22 to address specific receiving units 32 within the plurality of units, the state data 18 is associated with spatial coordinate data 20. The term spatial coordinate refers to a coordinate which may take various forms such as for example a position in an array of data, a location within a table, the position of a switch in a matrix addresser, a physical location, etc.

Projector

Figure 5:
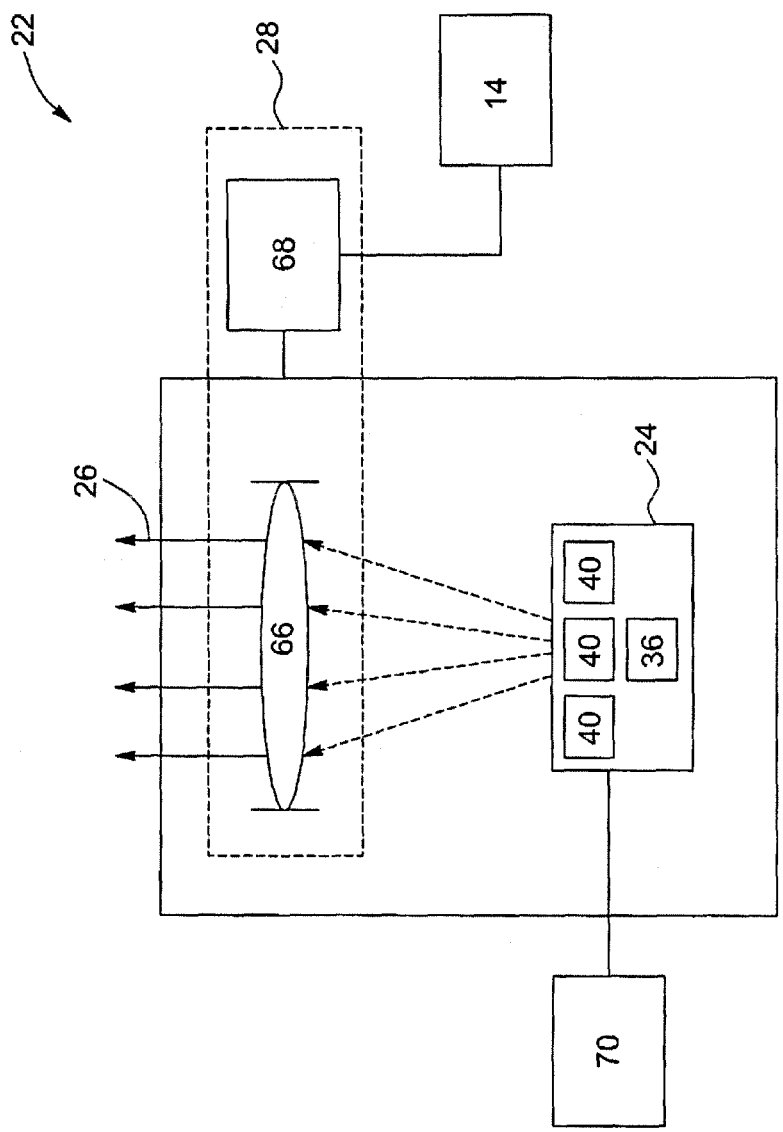
FIGS. 5, 6 and 7 are schematic diagrams representing different embodiments of a projector, respectively.
Figure 6:
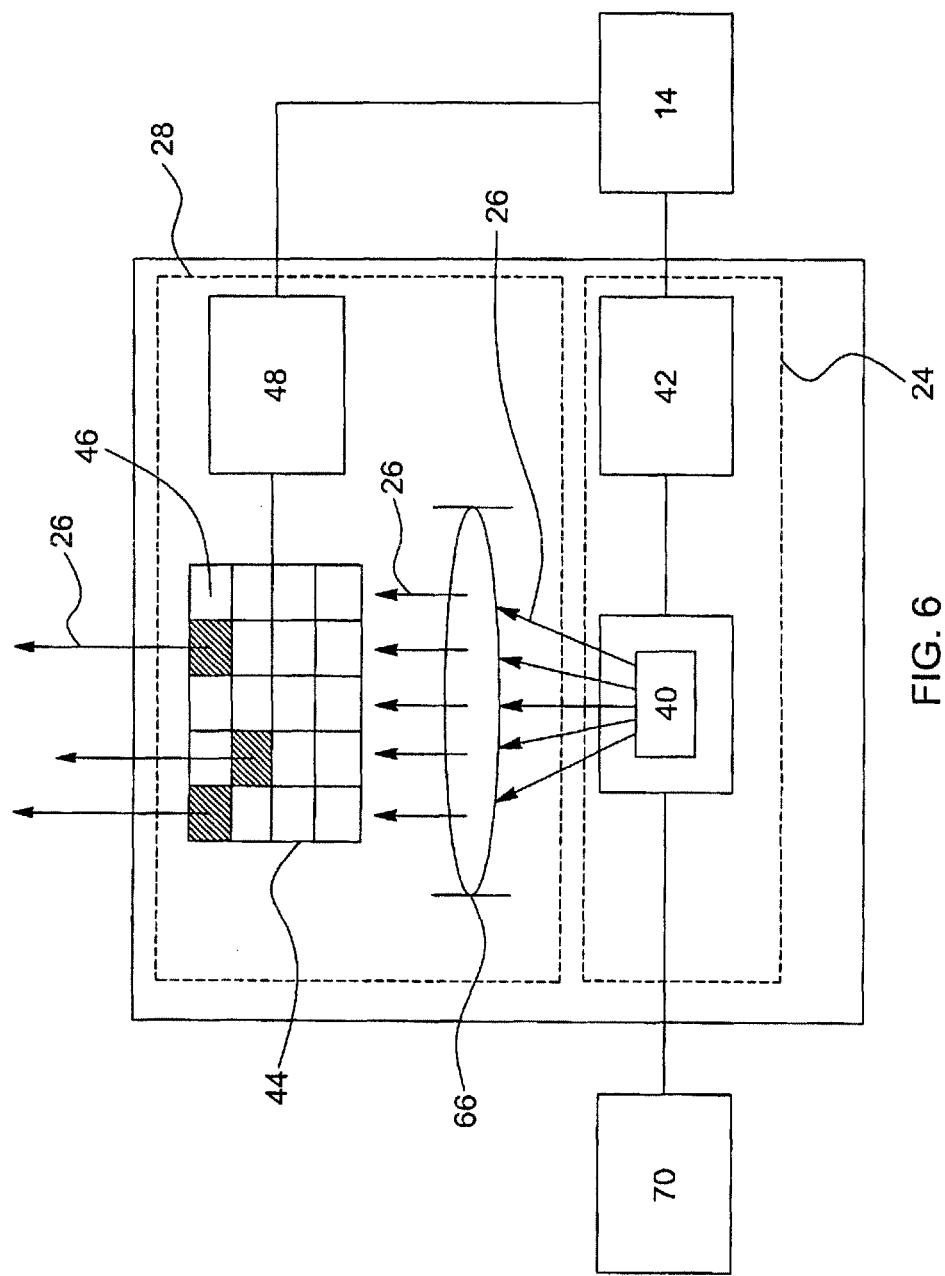
Figure 7:
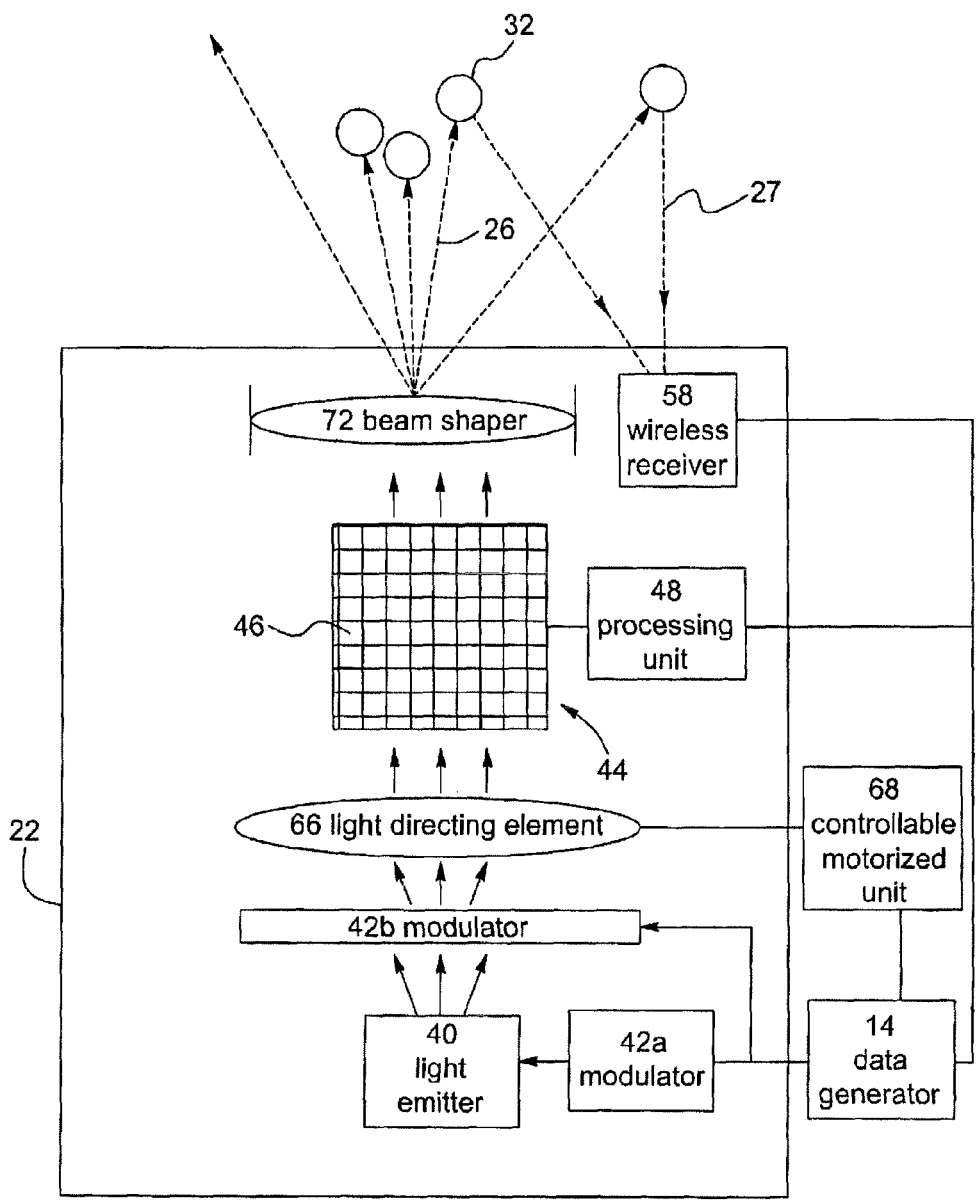

Now with reference to FIGS. 5 to 7, different embodiments of the projector 22 are shown. A projector 22 can be any device able to project directional electromagnetic signals. It can be fixed or mobile, and a projection system 10 according to the present invention can include one or several projectors.

The projector 22 is in communication with the data generator 14 and receives the data sets therefrom. While in FIG. 1 the data server 14 is shown apart from the projector 22, it can be considered to include the data generator 14 within the projector 22. In either case, the connection between the data generator 14 and the projector 22 allowing communication therebetween can be either a wired link or a wireless link. The projector 22 includes a signal generating module 24 and a projecting module 28.

The projector first includes a signal generating module 24 for generating electromagnetic signals 26 including of the state data contained in the data sets received. In other words, each electromagnetic signal 26 generated by the module 24 is representative of a specific state data 18 contained in a corresponding data set 16.

In this one embodiment, the electromagnetic signals 26 have a wavelength within the infrared spectrum. Other wavelengths may be considered without departing from the scope of the present invention.

The signal generating module 24 preferably includes one or more light emitters 40. Each light emitter 40 generates corresponding electromagnetic signals 26. The wavelength of the electromagnetic signals may be in the infrared, the visible or the ultraviolet spectrum, and the signal generating module 24 can include light emitters 40 generating electromagnetic signals at different wavelengths. The electromagnetic signals 26 may be monochromatic or quasi-monochromatic or have a more complex spectrum. For example, the light emitters may be embodied by lamps, lasers, LEDs or any other device apt to generate light having the desired wavelength or spectrum.

Referring more specifically to FIGS. 6 and 7, in particular embodiments of the invention, the signal generating module 24 may include an encoder for encoding each electromagnetic signal in order to obtain an encoded electromagnetic signal. While not shown in FIG. 5, this embodiment of the invention also preferably includes an encoder. The encoder may for example be embodied be a modulator which applies a modulation on each of the electromagnetic signals 26, the modulation corresponding to the state data transmitted by the data generator 14 and thereby being encoded within the electromagnetic signals.

With reference to the embodiment of FIG. 6, the data sent by the data generator 14 may be encoded within the electromagnetic signals 26 by the modulator 42 at the time of generating of the electromagnetic by the light emitter 40. Preferably, in this embodiment the modulator 42 is coupled directly to the light emitter 40 in order to control the emitter 40 such as to directly output the encoded electromagnetic signals. Alternatively or additionally, as seen in FIG. 7, the modulator 42*b* may be an external modulator disposed downstream the light emitter 40 and applying the modulation on the electromagnetic signals 26 after they have been generated and outputted by the emitter. The external modulator may for example be embodied by an amplitude modulator, a phase modulator or a more complex modulating system as well known to those skilled in the art.

The modulation can be either an analog or a digital modulation. The modulator 42 preferably generates a modulation signal having an amplitude, a frequency and a phase, each of these parameters being possibly controllable to perform the desired modulation. The projector 22 can include modulators 42 to modulate the signal of light emitter 40 in one or in a combination of modulation methods. Modulation techniques such amplitude modulation, frequency modulation, phase modulation, phase-shift keying, frequency-shift keyin, on-off keying, spread-spectrum and combinations of these techniques are well known to those skilled in the art.

In other embodiments, the encoder may be embodied by other types of devices which act on the electromagnetic signals 26, a filter and/or shutter 22 placed in front of the radiation emitters 40. Both encoding methods may be used in conjunction.

As explained previously, a projector 22 can be provided with a single light emitter 40 or combinations of emitters 40 in order to communicate with receiving units 32 using many wavelengths concurrently. Similarly, the signal of a light emitter 40 can be modulated sequentially or concurrently in different ways to communicate different information. Both methods can be used concurrently. In other words, the projector 22 can project the electromagnetic signals 26 successively or in parallel, at least for some of the signals.

For example, a projector 22 can modulate the signal 26 of an infrared emitter 40 at three different frequencies in order to transmit state data 18 on three independent channels. Receiving units 32 equipped with amplifiers and/or demodulators tuned to these three frequencies may then change state according to the signal they receive on three independent channels. For example, using red, green and blue LEDs coupled to each of these three associated state color allows the units 32 to display full-color video in real-time.

Referring still to FIGS. 5, 6 and 7, the projector 22 also includes a projecting module 28 for projecting the electromagnetic signals 26 generated and optionally encoded by the light generating module towards the target locations within the environment, as defined by the corresponding coordinate data.

Various devices and configurations may be used in the projecting module to spatially direct electromagnetic signals in various directions.

Referring to FIG. 5, in one embodiment the projecting module 28 may include a light directing element 66, such as collimator, which is disposed in the path of the electromagnetic signals 26, and a motorized assembly 68 coupled to the light directing element 66 in order to move it. Control of the motorized assembly 68 can be performed from within assembly itself, for example with a microcontroller (not shown), or it can be made via a control module within the data generator 14. The position of the light directing element 66 is adjusted and changed along one, two or three axes in function of the spatial coordinate data sent by the generator 14, allowing the electromagnetic signals 26 to be directed towards specific locations in a given space. Of course, in other variant of the invention, the data generator 24 and the controllable motorized unit 68 can be included within the enclosure of the projector 22.

Referring to FIG. 6, in accordance with another embodiment, the projecting module 28 may include a matrix addresser 44 in the path of the electromagnetic signals 26. The matrix addresser may for example be embodied by devices such an array of scanning mirrors or of liquid-crystal matrices, such as the ones used in video projectors. The matrix addresser 44 therefore generally has a plurality of switch elements 46 each controllable to either block the electromagnetic signals 26 incident on it or to propagate the signal towards a target location. In other words, the matrix addresser 44 can be viewed as an array of switches 46 turned on or off for transmitting the signal or not. The switches may include components such as micro-mirrors which can be controlled independently to direct the portion of the electromagnetic signal being transmitted in the desired direction. It is also possible for the mirrors of the matrix addresser to modulate the beam incident thereon. For example, the modulator 42 can modulate the signal received by the data generator 14, generating an electromagnetic signal of 1 MHz, and a mirror 46 of the matrix addresser 44 can further modulate the electromagnetic signal at 1 KHz, in response to instructions from the processing unit 48. Of course, it is possible for either individual mirrors or groups of mirrors to modulate the signals received using different modulating parameters, for example, using different frequencies, different width or duration of pulses (PWM or PMD), etc.

The processing unit 48 thus controls the operation of the matrix addresser 44 according to the spatial coordinate data 20 sent by the data generator 14. This spatial coordinate data 20 can correspond for example to the location of a specific micro-mirror within a Digital Micromirror Device (DMD). The spatial coordinate data 20 can also refer to a specific group of micro-mirrors within such a projector 22. In other embodiments of the invention where the projector is moved by a controllable motorized unit, the spatial coordinate data would correspond a position of the projector within a given referential.

Using a matrix addresser 44 provides the advantage of being extremely precise for addressing units 32 independently. The micro-mirrors array and liquid-crystal matrix systems also have the benefit of being able to concurrently address the receiving units 32, while a scanning mirror system is limited to sequential addressing. Alternatively, both types of control, successive or parallel, may be combined in a single system, as for example shown in FIG. 7.

The state data may be encoded in the electromagnetic signals projected by the projector through modulation. In other variants, the state data may be defined by the absence or presence of an electromagnetic signal. For example, in the embodiment shown in FIG. 1, data sets 16 send from the generator 14 to the projector 22 include: 1) state data 18 relative to a lighting state of the receiving units 32, the state being either light-on or light-off, and 2) spatial coordinate data 20 associated with the state data 18, corresponding to a specific group of micro-mirrors of the projecting module 28. Some of the micro-mirrors will project electromagnetic signals 26 transmitting a "light-on" state, and other will project electromagnetic signals 26 transmitting a "light-off" state. Of course, as an alternative, a group of micro-mirrors can project the electromagnetic signals 26 with the "light-on" state, while the remaining micro-mirrors will not transmit any signal, some of the receiving units not receiving any signal, and thereby staying switched off. As explained earlier, it is also possible for mirrors of the matrix addresser to further encode the signals, each mirror being able to modulate the incident signal received.

It will be readily understood that the projector may further include any number of optical components as required by the particular design of the device in order to further shape, direct or focus the electromagnetic light signals. A light directing element 66, or a beam shaper, such as a lens or a collimator, may be placed frontward of the matrix addresser 44. In some embodiments, the projector may for example include one or more collimators and/or a beam shaper for shaping the electromagnetic signals 26 into a desired pattern in order to address a specific group of units 32 dispersed in the environment, in a similar fashion as when a gobo lamp projector is used.

Figure 4:
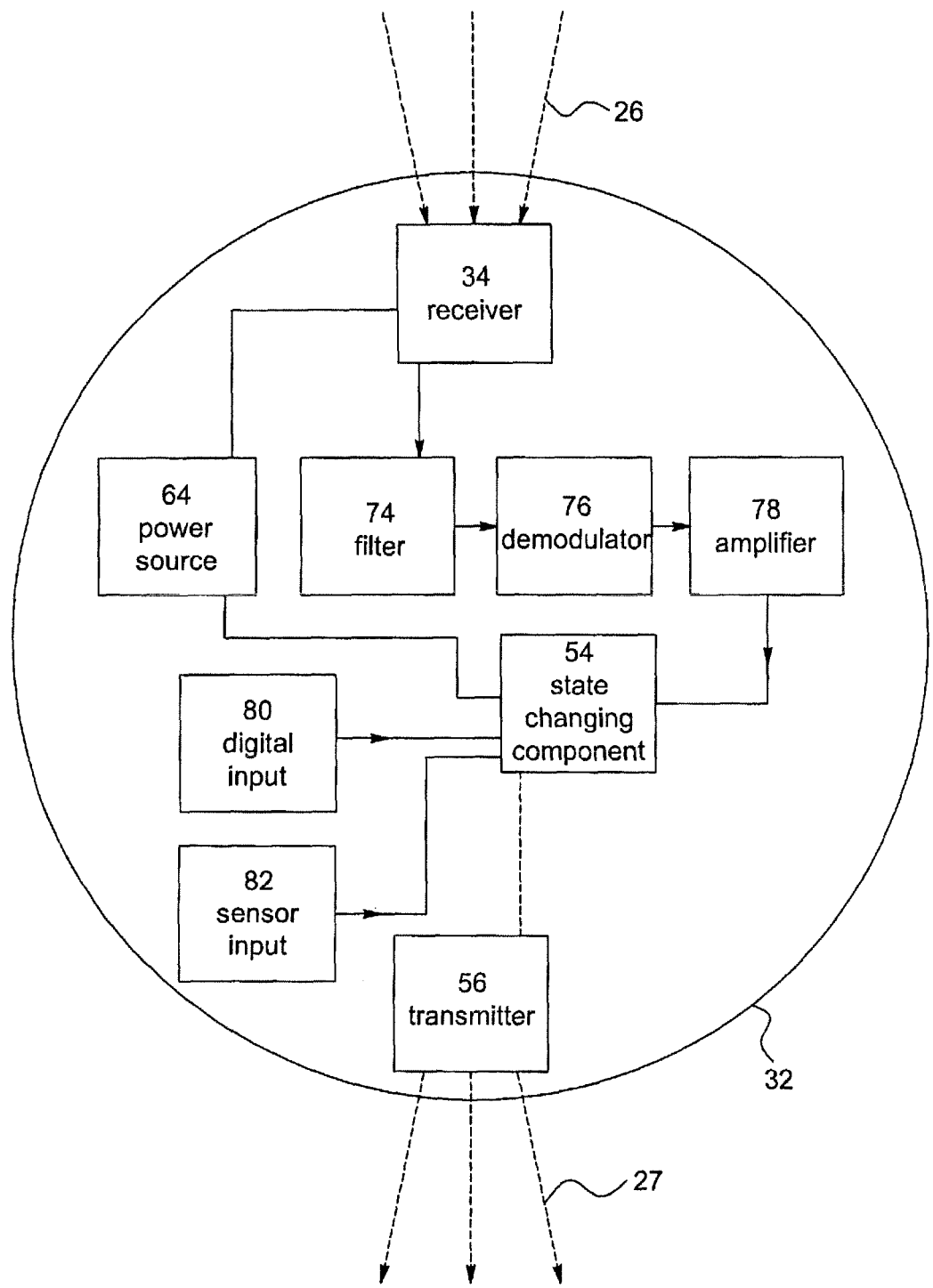

The projector 22 may also include a wireless receiver 58 in order to receive feedback signals 27 from a wireless transmitter 56 of the receiving units 32 (shown in FIG. 4). The feedback can include information relative to the current state of the units, their digital or analog inputs, their current geo-location or any other information. Of course, the wireless receiver 58 is an optional element of the projector 22.

One skilled in the art will readily understand that the various illustrated combinations of the components of the projectors illustrated in FIGS. 5, 6 and 7 are shown for illustrative purposes only, and that different combinations could be made without departing from the scope of the present invention.

Receiving Units

Figure 3:
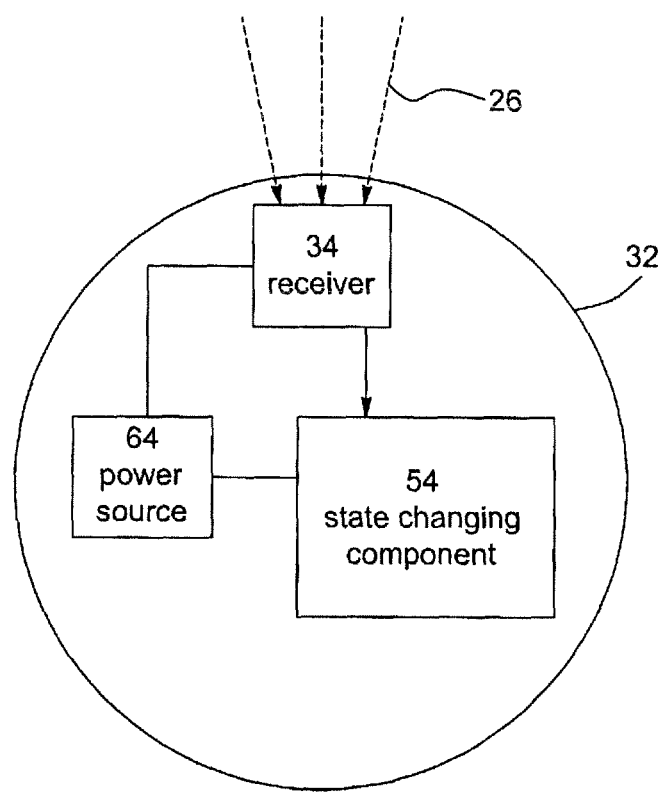
FIGS. 3 and 4 are schematic diagrams of two different embodiments of a receiving unit, respectively.

Best shown in FIGS. 3 and 4, each of the receiving unit 32 is at least provided with a receiver 34 and with a component 54 allowing the unit to display or express a state. Of course, the receiving units are also provided with a power source 64 for powering the receiver 34 and the state changing component 54. For example, each of the receiving units 32 used in the embodiment illustrated in FIG. 1 can be provided with an infrared sensor as the receiver 34 and with one or several LEDs as state changing components 54, the LEDs being switched ON or OFF according to the signal 26 received.

Referring back to FIG. 1, the receiving units 32 may be positioned in a given target location 30 will perform a change of state in response to the state data transmitted by the electromagnetic signal received. In other words, the receiving units 32a located within the target location 30 of the micro-mirrors projecting the signals with the "light-on" state will light up their LEDs, while the receiving units 32b located outside the target location of micro-mirrors projecting the light-off mode will have their LEDs switched off, such that the plurality of receiving elements 32 distributed within the space will display a star.

While the plurality of receiving units shown in FIG. 1 has a two-dimensional configurations, it can also be considered to distribute the receiving units 32 in a three-dimensional configuration. Of course, in other embodiments, other state changing component 54 can be used instead of the LEDs, as it will be explained later on.

Figure 8:
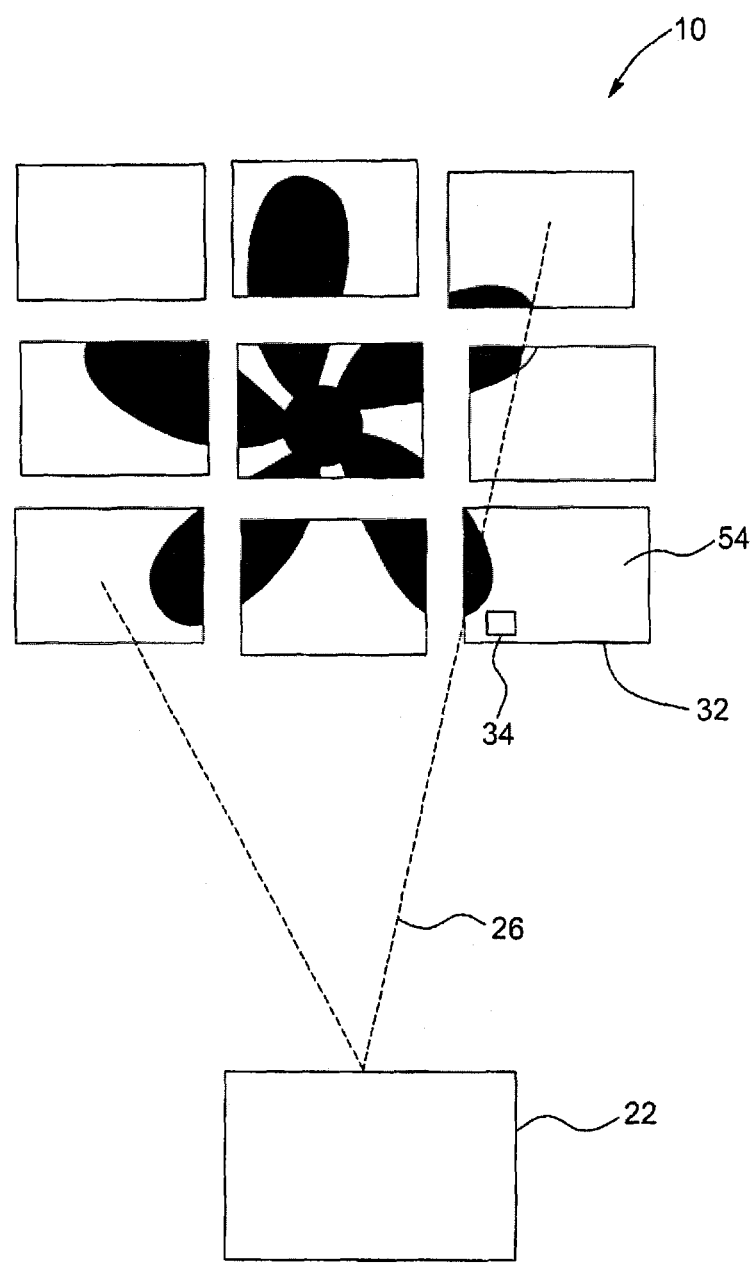
FIG. 8 is a schematic diagram of yet another variant of a projection system, according to a preferred embodiment of the invention.

With reference to FIGS. 3, 4 and 8, receiving unit 32 for use with projection systems according to embodiments of the invention are shown. Each receiving unit 32 is adapted to perform a change of state according to the state data received within the electromagnetic signals 26. Preferably, the units 32 are electrically independent from the other receiving units 32.

In other words, there is preferably no wired connection between the units 32, which advantageously allows increasing the mobility of each individual unit 32. Each unit 32 wirelessly receives information relative to the state it must take from the projector 22. The receiving unit 32 receives electromagnetic signals from the projector 22 using a receiver 34, for example, a signal detector. The receiver 34 may for example be embodied by an infrared receiver, a light sensor, or the Charge-Coupled Device (CCD) or CMOS image sensor of a camera, or any other appropriate device. The receiver 32 is also preferably provided with a decoder to decode or read the state data embedded in the electromagnetic signal, such as an analog or digital decoder. Once the unit 32 has decoded the state information sent wirelessly from the projector 22, the receiving unit 32 changes state so that it corresponds to the state data encoded within the electromagnetic signal received.

Various types of components can be envisaged. State changing component 54 can include light emitting, light reflecting or light filtering members such as, but not limited to, light-emitting diodes (LEDs), organic LEDs, quantum dots, incandescent lights, neons, liquid crystal displays (LCD), plasma displays, electronic paper displays, electro-chromic displays, thermo-chromic displays, electro mechanically-actuated light filters, electroluminescent elements and phosphorescent members. In other types of manifestations the change of state may also take the form of sound, shape, motion, odor, texture, and is therefore not restricted to visible changes.

The receiving unit 32 may be embodied by any device able to receive a data signal 26 from a projector 22, and to change of state in response to the received signal 26. For example, but not limited to, the receiving unit 32 can consist of a mobile phone, a digital media player or a watch provided with an electromagnetic detector such as a camera, a light sensor, an infrared receiver, usable in conjunction with a projector and adapted to change of state. In another example, the receiving units may be an array of speaker distributed within a given space and wirelessly updated using the projecting system 10 of the invention. In another embodiment of the invention, the receiving units can be motorized puppets distributed to visitors in a park, each puppet taking different facial expressions or emitting different fragrances depending on where the visitor is located in the park. Yet another example includes a board game where each puck on the board game changes shape depending on its location on the board using electrostrictive actuators or electromagnets.

The receiving units 32 are preferably further adapted to receive, decode and express state commands which do not necessarily induce a physical manifestation. A receiving unit 32 may be sent other types of data in addition to a state data, from the projector 22. Non restrictive examples can be commands to switch the receiving units 22 into a low-power consumption mode (sleep), grouping data for grouping units into various sub-groups, program update data for programs saved within a receiving unit, current geo-location of the receiving units, and the like.

With reference to FIG. 4, the each receiving unit 32 is preferably provided with a filter 74, a demodulator 76, and amplifier 78, a digital input 80 and a sensor input 82. Of course, only one of these elements can be provided, and their order in the unit 32 for processing the signal received can vary. For example, the signal 26 detected by the receiver 34 can be first amplified, and then filtered, or first demodulated, and then amplified and filtered. A variety of signal processing can be executed within the unit 32.

In addition, yet in other embodiments, the units 32 can include more than one of these signal processing elements. For example, a unit may be provided with two receivers 34, each able to receive a signal at a specific wavelength. Associated with each of these receivers 34, a state changing component 54 can be provided. When detecting a signal at first given wavelength the unit 32 can blink and when detecting a signal at another given wavelength the unit 32 can vibrate. The digital and sensor inputs 80, 82 can be used to modify the state of the state changing component 54. For the sake of clarity not all elements are linked to the power source 64, although it is understood that elements requiring power are linked to a power source.

Still referring to FIG. 4, the unit 32 may be provided with a wireless transmitter 56 in order to send feeback signal 27 to the projector 22. The transmitter 84 can interact with the inputs 80 and 82 or not. Such feedback can include information on the current state, the digital or analog input 80, 82 of the unit 32, and on its current geo-location or the like.

With reference to FIG. 8, the receiving units 32 are adapted to change of color, and units 32 consist of a cluster of an array of light emitting, light reflecting or light filtering members and are thus not reduced to individual color changing units. For example, the receiving unit 32 can be a cell phone, the receiver 34 being the camera of the cell phone, and the screen of the cell phone being the sate changing component 54. The projector 22 projects signals in which the state data encoded consists of infrared binary codes, which can include for example a QR code. The binary codes are sent from the projector 22 to a group of people holding camera-phones 32, such as an IPhone4, with a front-facing camera 34. Camera-phones 32 can have been previously provided with an application controlling focus of the camera. Such control can for example allow putting the camera out of focus. The binary codes sent by the projector to the camera could then trigger different animations on the camera-phone display screen 34 depending on the physical location of the phones within a given space. Such a projection system thus creates a large animation within a crowd using the plurality of the camera-phones. Yet in another embodiment of the invention, the receiving units 32 can include a color liquid crystal (LCD) display, organic LED display or plasma display.

Thus, a cluster of such units 2 can form an LCD array which can be used to display static images, animations or video on an area larger than the area from an individual LCD.

Of course, the shape and size of the individual receiving units 32 can vary within the plurality of units 32. In other words, each receiving unit 32 can have a shape different from the rest of the units 32. The units 32 can take different shapes, be made of different materials and have different types of physical and/or digital manifestations mechanisms within a group of units 32.

Still other examples of receiving units can include different types of digital components such as: memory card readers; USB ports; discrete sensors; momentary push buttons; tilt switches; continuous sensors such as microphones and accelerometers. These types of components advantageously allow users to interact with the projection system, and thus with other units of the system. For example, some of the receiving units 32 can be provided with microphones, allowing the units 32 to autonomously control their state, in addition to change state in response to signals sent by the projector 22.

Projection Method

According to another aspect of the invention, there is also provided a method for providing a distributed manifestation within an environment.

Figures 9A, 9B:
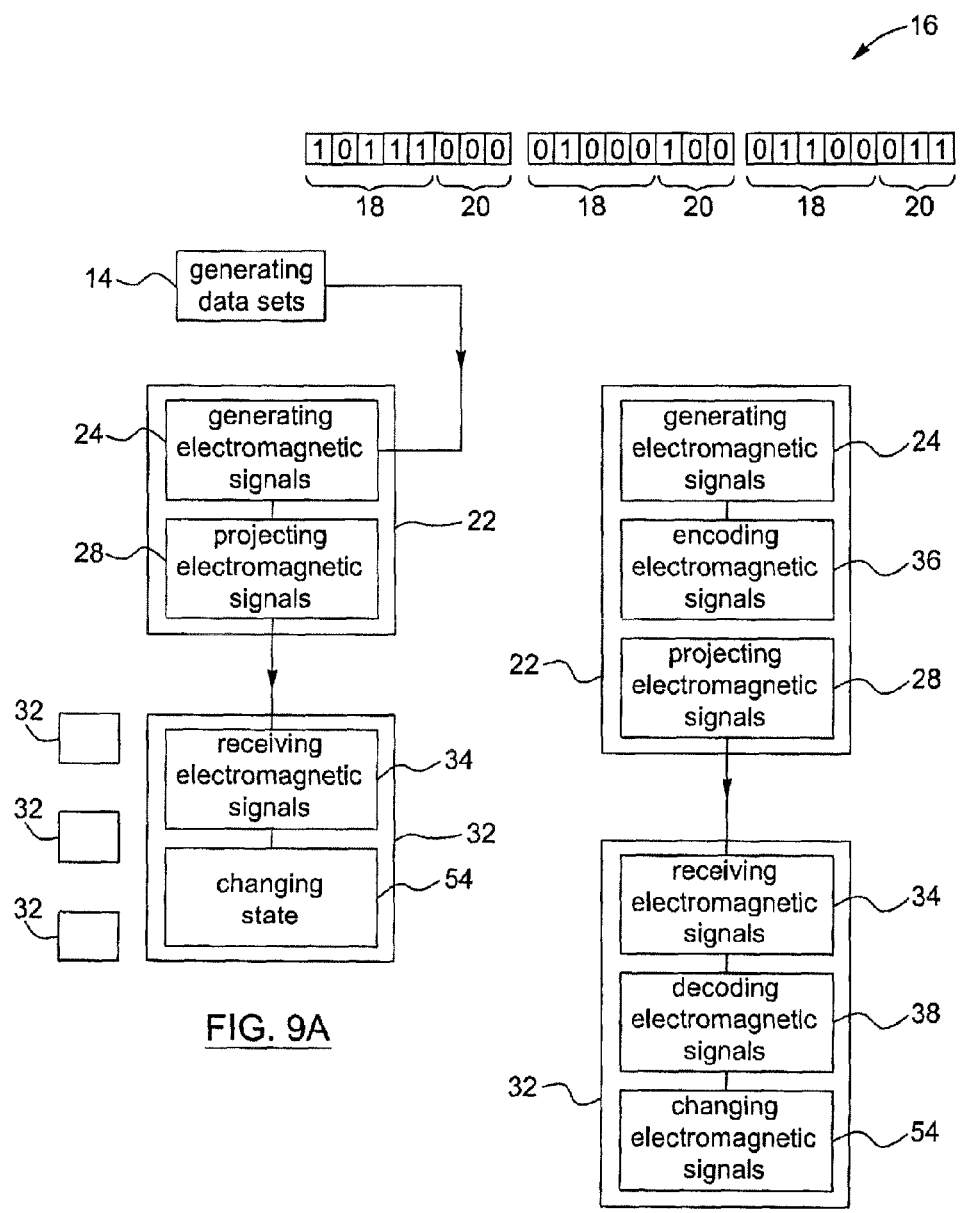
FIGS. 9A and 9B are flow charts illustrating the steps of a projecting method according to two preferred embodiments of the invention.

With reference to FIG. 9A, the method includes a first step of generating a plurality of data sets of associated state data and spatial coordinate data. The data generator 14 generates state data 18 and associates it with spatial coordinates 20, by rasterizing the data. This combined stated and spatial coordinate data forms the data sets.

In the following step, the signal generating module 24 generates a plurality of electromagnetic signals, each being representative of the state data from one of the data sets.

Next, each of the electromagnetic signals is projected by the projecting module 28 towards a target location within an environment, the target location corresponding to the spatial coordinate data associated with the state data transmitted by the electromagnetic signal.

A plurality of receiving units is distributed within the environment. At each of the target location where a receiving unit 32 is positioned, the corresponding electromagnetic signal is received on the receiver 34 of the unit 32, the state changing component 54 changing of state in response to the state data of the signal received.

Preferably, and with reference to FIG. 9B, the method can further include the steps of encoding the electromagnetic signals into an encoded electromagnetic signal at the projector level, with an encoder 36, and of decoding the encoded electromagnetic signal received at the receiving unit, with a decoder 38.

Figure 10B:
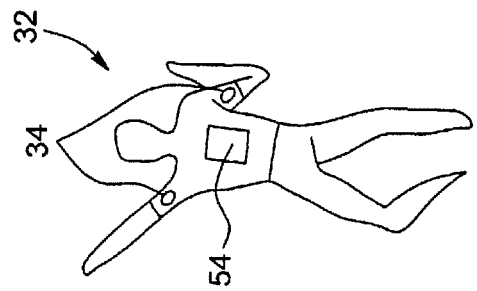
FIG. 10B is an enlarged view of an individual of the crowd provided with a receiving unit, according to an embodiment of the invention.
Figure 10A:
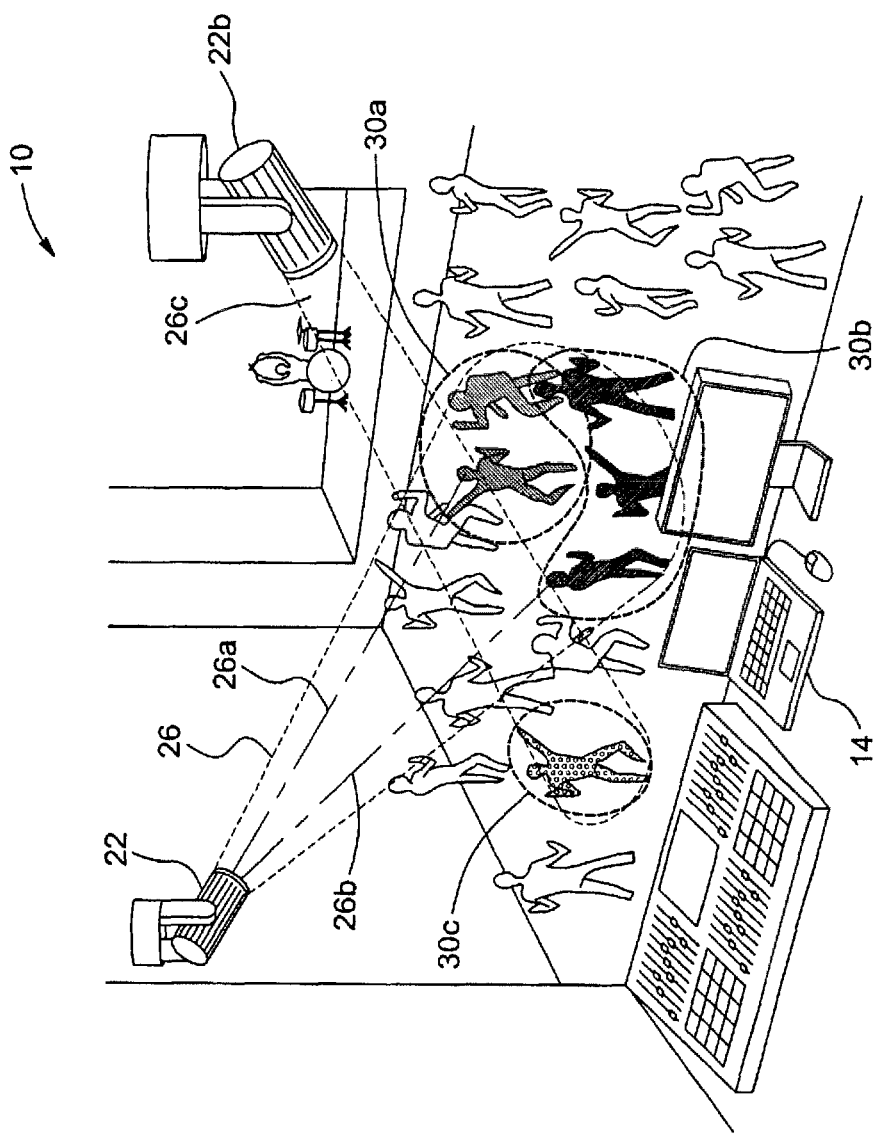
FIG. 10A is a schematic representation of a projection system for an application within a crowd.

Now referring to FIGS. 10A and 10B, an example of an application of the projection system 10 is shown. The projection system is deployed in an auditorium. Individuals within the crowd are provided with receiving units 32. In this example, the receiving unit is a piece of clothing provided with IR receivers 34 and the changing components 54 is an array of LEDs of different colors, embedded with the piece of clothing. The data generator 14, in this case a laptop, feeds two projectors 22a, and 22b with data sets, the projectors 22a, 22b being a digital light processor (DLP) projector including micro-mirrors arrays.

According to the data received, the projectors 22a, 22b send different signals 26 depending of the location towards which their beam is directed. In this example, some of the micro-mirrors of the projector 22a project signals 26 towards target location 30a, the state data of these signals 26a instructing the receiving units to light-up a blue LED. Simultaneously, other micro-mirrors of projector 22a project signals 26b towards target location 30b, the state data of these signals 26b instructing the receiving units 32 to turn on their red LED. The receivers 34 on the clothing detects the signals 26, decode the state change command embedded in the signal and transmit a command signal to the state changing component 54, triggering the LEDs to light-up or light-off.

The other projector 22b, can also simultaneously receive sets of data 16 from the laptop 14, converting the electrical signal into an electromagnetic signal 26c. The signals created will include a specific state data, for example, a blinking instruction for yellow LEDs. Each electromagnetic signal will then be directed towards a specific group of micro-mirrors, according to the coordinate information to which the state data was associated with. The projector 22c will then transmit the signals 26 to the target location 30c. As it can be appreciated, a projector 22 can simultaneously send different signals to different portions (or target locations) of the crowd. The clothing of a given individual will behave differently, depending on its location within the auditorium.

The combined effects of the lighted clothing will create a visual display within the crowd. In other words, each individual in the crowd becomes a pixel, the crowd forming a giant display allowing images to be projected on it, thanks to the receiving elements 32 they are wearing. The receiving units 32 being independent from each other, an individual can move across the room without affecting the display. The LEDs on the clothing of the individual will be lit up or not in function of the signals received, these signals being projected to specific portions of the room, without having to geographically localize the receiving units.

Of course, the projection system of the invention can have various applications, not only directed to crowd displays, but it can also be used for large area displays, dynamic camouflage, security systems, object tracking, games, etc.

Advantageously, the projection system of the invention is scalable in size and in resolution. The system is easy to deploy indifferent types of environments. The receiving units are mechanically and electrically autonomous rendering them mobile. The projection system is simple, and the projector mechanism allows precisely addressing each receiving unit within a group of units.

Of course, numerous modifications could be made to the embodiments above without departing from the scope of the present invention.

The invention claimed is:

1. A projection system for providing a distributed manifestation within an environment, the projection system comprising:
a data generator for generating a plurality of data sets, each of the data sets comprising spatial coordinate data and state data associated with the spatial coordinate data;
a projector in communication with the data generator for receiving the data sets therefrom, the projector comprising:
a signal generating module for generating a plurality of electromagnetic signals, each one of said electromagnetic signals being representative of the state data from at least one of said data sets; and
a projecting module for projecting each of the electromagnetic signals for receipt at a target location within said environment corresponding to spatial coordinate data associated with state data represented by the electromagnetic signal; and
a plurality of receiving units distributed within the environment, each receiving unit being operable to receive an electromagnetic signal from the projecting module, process the electromagnetic signal and express a state according to state data represented by the electromagnetic signal, the state expressed by each one of the receiving units depending at least in part on the target location at which the one receiving unit resides when the electromagnetic signal is received.

2. The projection system according to claim 1, wherein the signal generating module is provided with an encoder for encoding each one of said electromagnetic signals, thereby obtaining encoded electromagnetic signals; and each receiving unit is provided with a decoder for decoding said one encoded electromagnetic signal.

3. The projection system according to claim 1, wherein the signal generating module comprises at least one light emitter generating each of said electromagnetic signals at a wavelength selected between the group consisting of infrared wavelengths, visible wavelengths and ultraviolet wavelengths.

4. The projection system according to claim 3, wherein the light generating module comprises a plurality of said light emitters, each generating corresponding ones of said electromagnetic signals at a different one of the wavelengths from said group.

5. The projection system according to claim 3, wherein the light generating module comprises at least one modulator applying a modulation on each of said electromagnetic signals, said modulation corresponding to the state data encoded within said electromagnetic signal.

6. The projection system according to claim 5, wherein one of the at least one modulator is coupled to said light emitter and controls the same to directly output said encoded electromagnetic signals.

7. The projection system according to claim 1, wherein the projecting module comprises a matrix addresser disposed in a path of said electromagnetic signals, the matrix addresser having a plurality of switch elements each controllable to either block the electromagnetic signals incident thereon or propagate the same towards one of said target locations.

8. The projection system according to claim 7, wherein the projecting module further comprises a processing unit controlling said switch elements in view of the spatial coordinate data from said data sets.

9. The projection system according to claim 1, wherein the projecting module comprises a light directing element disposed in a path of said electromagnetic signals, and a motorized assembly coupled to said light directing element to move the same.

10. The projection system according to claim 1, wherein the state expressed by each receiving unit is selected from a group of states consisting of exhibiting one or more visual characteristics, producing one or more sounds, producing an odour, moving, and exhibiting one or more tactile characteristics.

11. The projection system according to claim 1, wherein each receiving unit comprises a state changing component operable to express state, the state changing component being selected from a group of state changing components consisting of light-emitting diodes, organic light-emitting diodes, quantum dots, incandescent lights, neon lights, liquid crystal displays, plasma displays, electronic paper displays, electrochromic displays, thermo-chromic displays, electromechanically-actuated light filters, electroluminescent elements and phosphorescent elements.

12. The projection system according to claim 1, wherein each receiving unit comprises a transmitter for transmitting feedback information; and the projector comprises a receiver for receiving said feedback information from the receiving units.

13. The projection system according to claim 1, wherein the state data correspond to a video stream.

14. The projection system according to claim 1, wherein the receiver of each receiving unit is selected from a group of receivers consisting of cameras, light sensors and infrared receivers.

15. A projector for providing a distributed manifestation within an environment through a plurality of receiving units, each adapted to express a state, positioned at target locations within said environment, the projector comprising:
 a receiver module operable to receive a plurality of data sets comprising spatial coordinate data and state data associated with the spatial coordinate data;
 a signal generating module operable to generate a plurality of electromagnetic signals and encode each one of said electromagnetic signals with the state data from at least one of said data sets, thereby obtaining encoded electromagnetic signals; and
 a projecting module operable to project each one of the encoded electromagnetic signals for receipt at a target location within said environment, the target location to which each one of the encoded electromagnetic signals is projected corresponding to the spatial coordinate data associated with the state data encoded within the one electromagnetic signal;
wherein each encoded electromagnetic signal, when received by one of the plurality of receiving units at a particular target location, causes the one receiving unit to process the encoded electromagnetic signal and express a state according to the state data encoded in the electromagnetic signal, the state expressed by the one receiving unit depending at least in part on the target location at which the one receiving unit resides when the encoded electromagnetic signal is received.

16. The projector according to claim 15, wherein the signal generating module is provided with an encoder for encoding each one of said electromagnetic signals.

17. The projector according to claim 15, wherein the signal generating module comprises at least one light emitter generating each of said electromagnetic signals at a wavelength selected between the group consisting of infrared wavelengths, visible wavelengths and ultraviolet wavelengths.

18. The projector according to claim 17, wherein the light generating module comprises a plurality of said light emitters, each generating corresponding ones of said electromagnetic signals at a different one of the wavelengths from said group.

19. The projector according to claim 17, wherein the light generating module comprises at least one modulator applying a modulation on each of said electromagnetic signals, said modulation corresponding to the state data encoded within said electromagnetic signal.

20. The projector according to claim 19, wherein one of the at least one modulator is coupled to said light emitter and controls said light emitter to output said encoded electromagnetic signals.

21. The projector according to claim 15, wherein the projecting module comprises a matrix addresser disposed in a path of said encoded electromagnetic signals, the matrix addresser having a plurality of switch elements each controllable to either block the encoded electromagnetic signals incident thereon or propagate the same towards one of said target locations.

22. The projector according to claim 21, wherein the projecting module further comprises a processing unit controlling said switch elements in view of the spatial coordinate data from said data sets.

23. The projector according to claim 15, wherein the projecting module comprises a light directing element disposed in a path of said encoded electromagnetic signals, and a motorized assembly coupled to said light directing element to move the same.

24. The projector according to claim 15, wherein the state data is representative of a video stream.

25. A method for providing a distributed manifestation within an environment, the method comprising acts of:
 a) generating a plurality of data sets, each of the data sets comprising spatial coordinate data and state data associated with the spatial coordinate data;
 b) generating a plurality of electromagnetic signals, each one of said electromagnetic signals being representative of the state data from at least one of said data sets;
 c) projecting each of the electromagnetic signals for receipt at a target location within said environment corresponding to spatial coordinate data associated with state data represented by the electromagnetic signal;
 d) at each of a plurality of receiving units distributed at target locations within the environment:
  i) receiving and processing an electromagnetic signal; and ii) expressing a state according to state data represented by the electromagnetic signal, the state expressed by the receiving unit depending at least in part on the target location at which the receiving unit resides when the electromagnetic signal is received.

26. The method according to claim 25, further comprising acts of:
   xi) after the act b), encoding each one of said electromagnetic signals into an encoded electromagnetic signal; and
   xii) after the act d)i), decoding the encoded electromagnetic signal received.

27. The method according to claim 25, wherein in the act a), the state data is representative of a video stream.

28. The method according to claim 25, wherein the state expressed by the receiving unit in the act d)ii) comprises exhibiting one or more visual characteristics, producing one or more sounds, producing an odor, moving, and exhibiting one or more tactile characteristics.

\* \* \* \* \*